United States Patent [19]

Pasieka et al.

[11] 3,775,594

[45] Nov. 27, 1973

[54] ENCODED IDENTIFICATION CARD SYSTEM

[75] Inventors: John F. Pasieka; Charles B. Kennedy, both of Acton, Mass.

[73] Assignee: Polaroid Corporation, Cambridge, Mass.

[22] Filed: Oct. 9, 1970

[21] Appl. No.: 79,616

[52] U.S. Cl. 235/61.11 E, 235/61.7 B, 235/61.12 N, 250/219 R

[51] Int. Cl. .......... G06k 7/14, E04g 17/00

[58] Field of Search .......... 235/61.12 R, 61.12 N, 235/61.11 E, 61.7 B; 340/149 A; 250/219 R

[56] References Cited

UNITED STATES PATENTS

| | | | |
|---|---|---|---|
| 3,206,724 | 9/1965 | Stahl | 235/61.7 R |
| 3,212,203 | 10/1965 | Atkinson | 235/61.6 E |
| 2,438,825 | 3/1948 | Roth | 235/61.11 E |
| 2,482,242 | 9/1949 | Brustman | 235/61.11 E |
| 3,562,494 | 2/1971 | Schmidt | 235/61.11 E |
| 3,632,995 | 1/1972 | Wilson | 235/61.12 N |
| 3,220,301 | 11/1965 | Koonz et al. | 235/61.12 R |
| 3,548,160 | 12/1970 | Welsh | 235/61.11 E |
| 2,914,746 | 11/1959 | James | 235/61.7 B |
| 3,283,303 | 11/1966 | Cerf | 235/61.12 R |
| 2,594,358 | 4/1952 | Shaw | 235/61.11 E |
| 3,310,658 | 3/1967 | Ryer | 235/61.11 E |
| 3,409,760 | 11/1968 | Hamisch | 235/61.12 R |

*Primary Examiner*—Daryl W. Cook
*Attorney*—Brown and Mikulka, William D. Roberson and Robert L. Berger

[57] ABSTRACT

In an encoded identification card system including means to manufacture the card and means to read the card, the card is produced with a facial image on the card of the person identified by the card. The entire card is produced photographically by preparing a data card including alphanumeric data and encoded data. The data card is then photographed onto the identification card as is the facial image of the person to be identified by the card. The encoded data on the card comprises code patterns along a code track with a timing track containing timing marks indicating when the code track is to be read out. The readout system of the card comprises an optical scanner which scans the code and timing tracks and, in addition, optically scans variable input data provided by the operator of the readout system and fixed input data. The fixed input data is encoded on a second card in the same manner that the data is encoded on the identification card. The variable input data is encoded on slats which are slidable relative to one another and relative to the optical scanning mechanism to place different code patterns in the track of the scanner.

11 Claims, 14 Drawing Figures

INVENTORS
JOHN F. PASIEKA &
CHARLES B. KENNEDY

BY Brown & Mikulka and
Richard L. Aitken
ATTORNEYS

INVENTORS
JOHN F. PASIEKA &
CHARLES B. KENNEDY

BY Brown & Mikulka and Richard L. Aitken
ATTORNEYS

INVENTORS
JOHN F. PASIEKA &
CHARLES B. KENNEDY
BY Brown & Mikulka and
Richard L. Aitken
ATTORNEYS INVENTORS
JOHN F. PASIEKA &
CHARLES B. KENNEDY
BY Brown & Mikulka and
Richard L. Aitken
ATTORNEYS

INVENTORS
JOHN F. PASIEKA &
CHARLES B. KENNEDY

BY Brown & Mikulka and
Richard L. Aitken ATTORNEYS

ENCODED IDENTIFICATION CARD SYSTEM

BACKGROUND OF THE INVENTION

This invention relates to identification card systems and, more particularly, to such systems using photographic facial images of the individual to be identified and machine readable encoded data on the identification card including a system for producing the identification card and a system for reading the encoded data on the card.

Until recent years identification cards of the type which included a facial image of the person identified were produced by taking the individual's photograph and pasting the photograph on the identification card containing printed identification data. Cards manufactured in this manner normally require several weeks for processing before the card is ready for use. Also, a possibility always exists that the photograph will be inadvertently placed on the wrong identification card. A system developed recently makes possible the production of the facial image and the printed data on a single piece of photographic material in the same operation. When the diffusion-transfer process is used to produce the photographic images on the card, the identification card is ready for use immediately.

SUMMARY OF THE INVENTION

The present invention is an improvement of the abovedescribed system in that in addition to the printed data on the card, machine readable encoded data is also produced on the identification card at the same time that the facial image and the printed alphanumeric data is produced on the card. The present invention also provides an improved optical system for reading out the encoded data and at the same time to optically read out the fixed input data and variable input data fed into the readout system by the operator of the readout system. The variable data is encoded on slidably positionable slats, which the operator positions to feed in the proper data. An optical scanning mechanism scans the coded data on the identification card and also the fixed input data and the variable input data on the slats. Resulting signals are converted to audio frequency signal combinations which are transmitted over telephone lines to a central station where the information is received and operated on. Because the optical scanning mechanism is needed to read out the encoded data on the identification card, the use of this scanning mechanism to also read out the other additional input data amounts to a significant simplification of the system. The data encoded on the identification card is in the form of a pattern in a code track. Adjacent to the code track is a timing track which is utilized to control the timing of the readout of the code track. The use of the timing track further simplifies the readout system because it eliminates the need for precise scanning speeds and the need for an internal clock in the electronics of the readout system. In addition, the use of the timing track makes it possible to use different spacings between the code mark positions and have gaps between the encoded data. This feature is important in the present system because the optical scanner reads out three different groups of data in one sweep, the data on the identification card, the fixed input data, and the variable input data and gaps necessarily occur between these data groups. Moreover, the variable input data in fact has larger spacings between code mark positions than the spacings on the identification card to facilitate their manufacture.

DESCRIPTION OF THE PREFERRED EMBODIMENTS

Figure 1:
FIG. 1 illustrates an example of an identification card of the present invention.

The identification card of the present invention shown in FIG. 1 has in the upper left hand corner a photographic facial image 5 of the individual which the card identifies. Alphanumeric identification data 6 is located opposite the photographic image. Preferably, across the bottom of the card are code markings which represent the identification number of the individual. In the illustrated embodiment, the code markings are arranged in two parallel tracks 7 and 8. The bottom track 8 is the timing track and contains equally spaced markings alternating between black and white extending perpendicular to the direction that the track extends. Each transition from black to white or from white to black represents a timing mark from which a timing pulse is to be derived. The upper track 7 is the code track and contains patterns of black and white code marks arranged in successive contiguous positions along the code track. Each code position going from left to right starts at a timing transition, which times the readout of that code position. Since the code mark positions are contiguous, the next successive timing mark defines the end of each code mark except the last code mark in the track. Also because the code mark positions are contiguous, two or more adjacent black code marks appear as one large black area and two or more adjacent white marks appear as one large white area in the track. Each alphanumeric character is represented by a different pattern of black and white code marks in four successive code mark positions. In the specific embodiment of the invention only decimal digits 0–9 plus two special characters * and # are represented by the code patterns. The 20 patterns of four code marks in successive code mark positions represent twenty characters comprising a 19 digit number identifying the card holder preceded by * to indicate the start of the identification number. A black code mark in a code mark position represents a binary one and the white code mark in a code mark position represents a binary zero. Thus, each of the 10 decimal digits is represented by a different four digit binary number.

Figure 2:
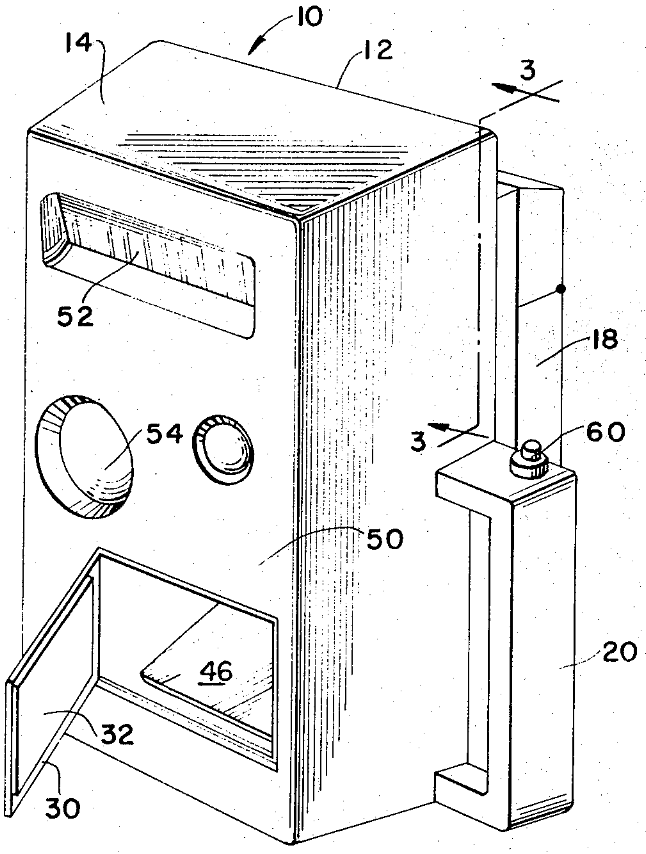
FIG. 2 is a diagrammatic perspective view of a camera system for making the identification card of FIG. 1 in accordance with the present invention.
Figure 3:
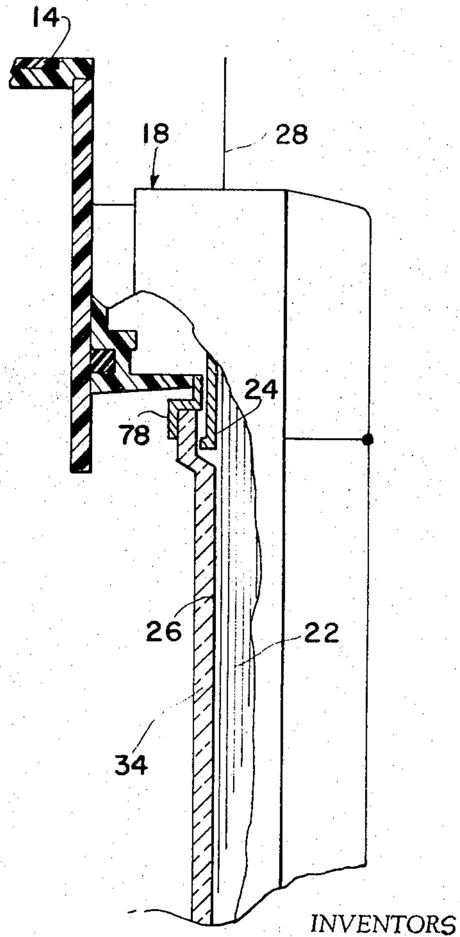
FIG. 3 is a fragmentary sectional view of the camera system of FIG. 2 taken along the lines of 3—3 of FIG. 2.

The entire identification card including the facial image 5, the alphanumeric identification data 6 opposite the facial image 5, and the timing and code tracks 7 and 8 are produced photographically on the identification card in one operation by the camera system 10 shown in FIGS. 2 and 3. The camera system 10 comprises an opaque housing 12 including a first section 14 in which the camera's optical system is contained and a film holder 18 removably connected thereto. Extending from one side of the camera's first section 14 is a handle 20 designed to be gripped by the operator for purposes of aiming and/or supporting the camera during exposure operations. Preferably the film holder 18 is adapted to receive a film pack 22 containing a plurality of film units (See FIG. 3), which is of the diffusion-transfer processing type, and to sequentially position the negative emulsion bearing photographic sheet 24 of each film unit at a focal plane 26 within the camera 10. Also housed within the film holder 18 are means (not shown) for effecting the application of a processing fluid between the negative emulsion bearing photographic sheet 24 and an image-receiving sheet of each film unit after exposure and as the film unit is withdrawn from the holder by the operator's pulling a tab 28 connected thereto. The specific forms of the film holder 18 and the film units contained in the film pack 22 do not constitute part of the present invention and, for instance, may be identical to those of such items currently being marketed.

The first section 14 of the camera system 10 is provided with a hinged door 30 on which a data card 32 may be removably mounted by any suitable means. When the hinged door 30 is closed with a data card 32 mounted thereon, the card is automatically positioned at the proper location within the camera system for subsequent exposure operations.

Figure 4:
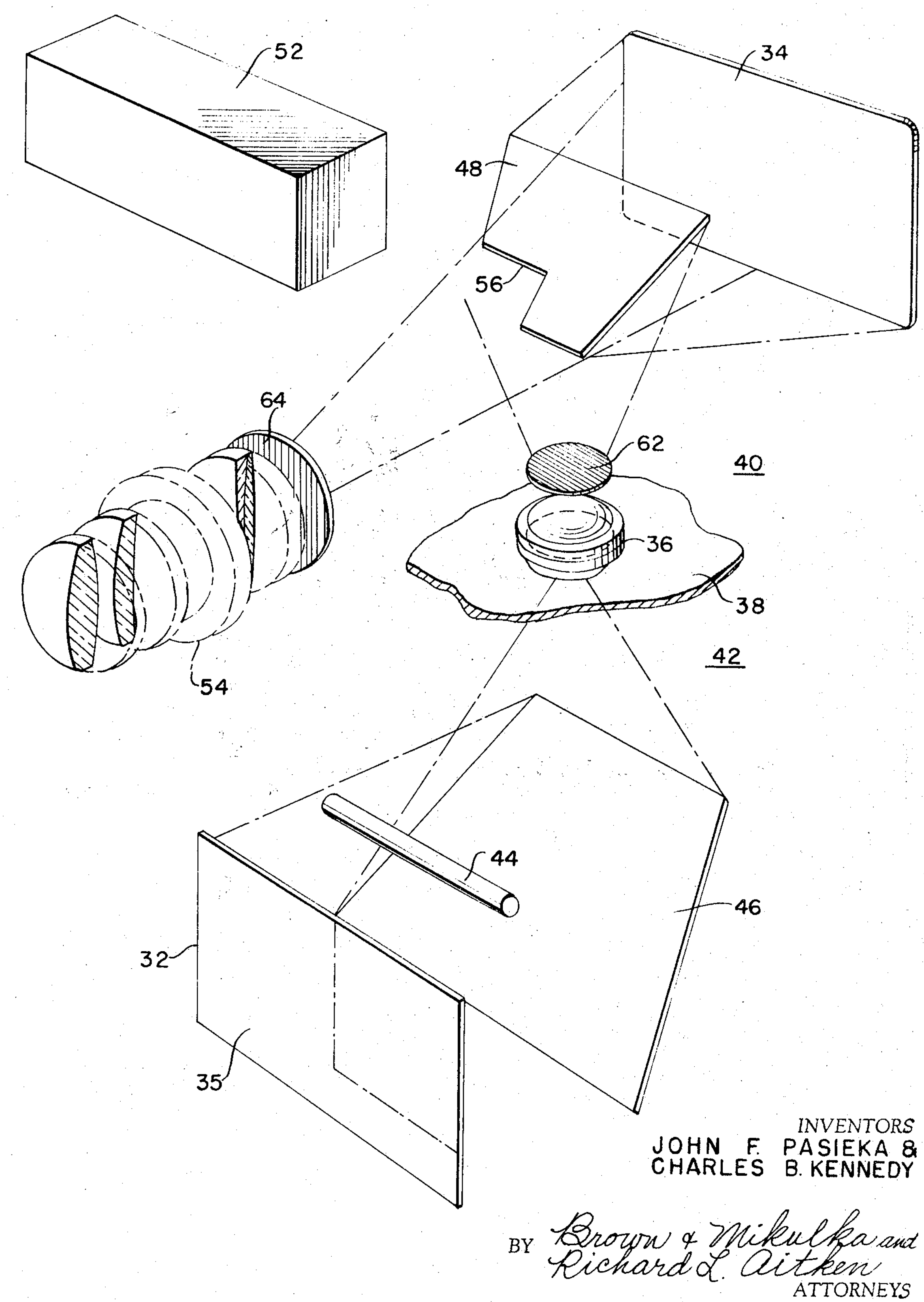
FIG. 4 is a diagrammatic perspective view of the optical system employed in the camera system of FIG. 2.

FIG. 4 diagrammatically illustrates the optical system housed within the section 14 of the camera 10 and the operable relationship between that optical system and a polarizing plate 34 which, in the illustrated preferred embodiment, is mounted within the film holder 18 so as to overlie the sheet of photographic material 24 positioned at the camera's focal plane (See FIG. 3). The nature of this polarizing plate 34 and the function which it performs within the camera system 10 will be discussed in detail hereinafter.

Figure 5:
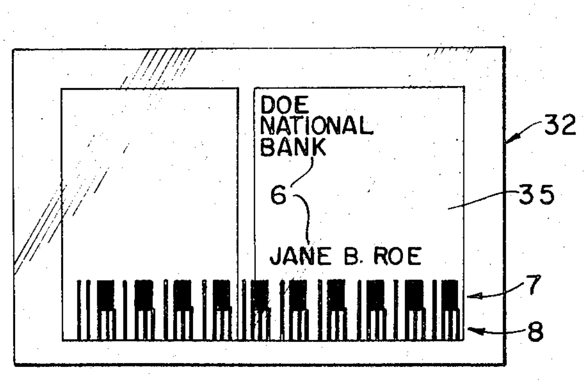
FIG. 5 illustrates a data card used by the camera system of FIG. 2 in making the identification card of the present invention.

The data card which is illustrated in FIG. 5 contains the alphanumeric data 6 and the code and timing marks 7 and 8 to be photographically reproduced on the identification card. As shown in FIG. 5, the data card is similar in arrangement to the identification card shown in FIG. 1 with the alphanumeric data 6 and the code and timing tracks 7 and 8 appearing on an L-shaped section of the card. However, a blank space is found on the data card where the facial image 5 appears on the identification card.

In FIG. 4 of the drawings, the data card 32 is shown as being positioned within the camera system 10 at the proper location for photographing. An objective lens-shutter element 36 associated with the data card 32 is mounted in an opaque internal wall member 38 of the camera system 10 which wall member effectively serves to divide that system into two separate light-tight chambers 40 and 42. Positioned within the camera system's chamber 42 is an electronic flash unit 44 which, when fired, serves to illuminate the data card 32. Conventional means (not shown) are provided to fire the flash unit 44 whenever the shutter of the element 36 is activated. Light rays from the illuminated data card 32 are reflected by a first mirror 46 through the lens-shutter element 36 onto a second mirror 48 and then redirected by that mirror onto the polarizing plate 34 overlying the photographic sheet 24. The objective lens of the element 36 serves to form an image of the data card 32 on the sheet of photographic material 24.

Located in the front face 50 (See FIG. 2) of the camera system 10 is a second electronic flash unit 52 and a second objective lens-shutter element 54 which facilitates the photographing of a subject positioned in front of the camera. In this connection, the flash unit 52 illuminates the subject and an image of that subject is formed by the objective lens 54 on the sheet of photographic material 24. In the illustrated preferred embodiment, the mirror 48 is provided with a cut-out (or unsilvered portion) 56 so as not to preclude certain light rays from the subject intersecting a selected section 58 (See FIG. 6) of the sheet of photographic material 24 on which it is intended to produce an image of the subject. Conventional means may be employed to fire the flash unit 52 upon opening of the shutter 54.

Conveniently mounted on the handle 20 is a button 60 (See FIG. 2) which may be selectively depressed by the operator to effect simultaneous exposure of the subject and data card 32. In this connection, a conventional arrangement may be employed to activate the shutters 36 and 54 whenever the button 60 is so depressed.

As in the case of the film holder 18, the film units contained therein and the arrangements for activating the shutters 36 and 54 and flash units 44 and 52, the lens-shutter elements 36 and 54, and the electronic flash units may take conventional or special forms other than as illustrated in the drawings within the scope of the present invention. Additionally, other arrangements of these elements within a camera system other than that illustrated and described in connection with the preferred embodiment of the present invention may be employed within the scope of this invention.

As shown in FIG. 4, a polarizing element 62 is mounted adjacent the lens-shutter element 36 so that all of the light rays passing through the lens-shutter element from the data card 32 are polarized by the element 62. Similarly, a second polarizing element 64 is mounted adjacent the lens-shutter element 54 so that all of the light rays passing through that lens-shutter element from the subject are polarized by the element 64. It is most important to note that the transmission axes of the polarizing elements 62 and 64 are orthogonally aligned with respect to each other.

Figures 6, 7:
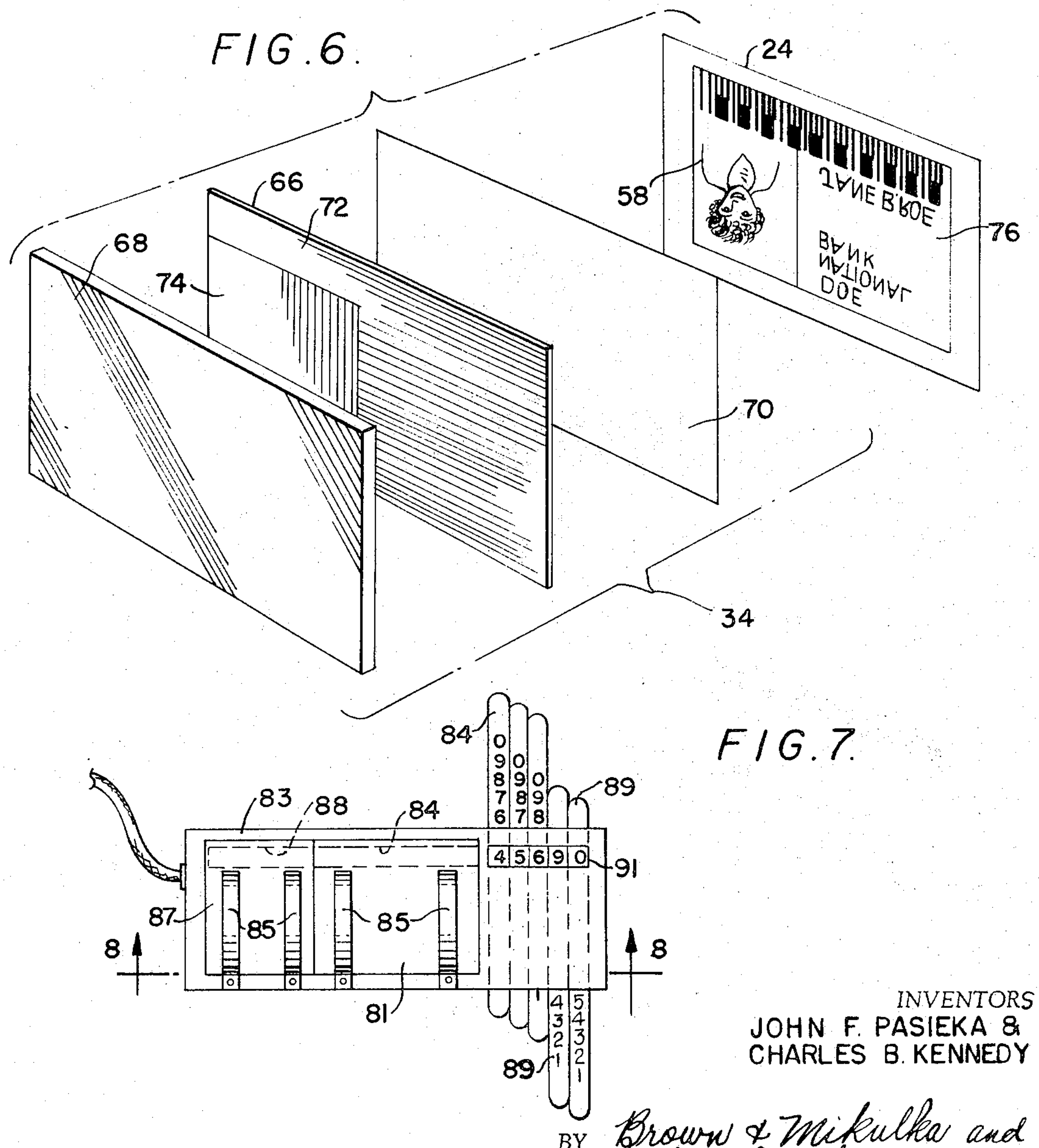
FIG. 6 is a diagrammatic exploded view of the validation plate forming part of the camera system of FIG. 2 and illustrating the operable relationship between the plate and a sheet of photographic material mounted in the camera system.
FIG. 7 is a plan view of the optical scanning system of the present invention.

Referring now to FIG. 6 of the drawings, it will be seen that the polarizing plate 34 is constituted by a sheet of polarizing materials 66 mounted between a pair of light transparent supports 68 and 70. As indicated, the polarizing plate 34 overlies and is positioned in close proximity to the sheet of photographic material 24. Consequently, the sheet of polarizing materials 66 may have approximately the same dimensions as the finished identification card. This sheet 66 comprises a first generally "L-shaped" section 72 having a transmission axis aligned with that of the polarizing element 62 and a rectangular shaped section 74 having its transmission axis aligned with that of the polarizing element 64. Conventional means may be employed to fabricate the sheet of polarizing materials 66. For instance, this sheet 66 may comprise a lamination of polyvinyl alcohol sheets, each having been stretched and molecularly oriented so as to be birefringent, appropriately dyed and printed in accordance with current techniques to provide the aforementioned sections 72 and 74 having orthogonally aligned transmission axes. Alternately, other conventional forms of polarizing sheet material may be cut, aligned and mounted on a suitable transparent support.

The supports 68 and 70 may be formed of any suitable material such as an acrylic lucite or a glass and appropriately adhered to the opposite faces of the sheet 66. These supports 68 and 70 not only serve to support the sheet of polarizing materials 66 but also serve to protect that sheet from foreign matter, abrasion, etc.

When the supports 68 and 70 are formed of acrylic material and the sheet 66 comprises a lamination of polyvinyl sheets as hereinbefore described, the overall thickness of the polarizing plate may be on the order of 0.125 inches. More specifically, the support 68 may be 0.090 inches in thickness, the sheet of polarizing materials 66 may be 0.012 inches in thickness and the support 70 may be 0.023 inches in thickness. To minimize any distortion of the images, it is desirable that the support 70 be relatively thin and that the polarizing plate 34 be mounted as close as possible to the sheet of photographic material 24. The plate 34 is mounted adjacent the photographic sheet 24 so that the sections 72 and 74 of its polarized sheet 66 respectively overlie the sections 76 and 58 of the photographic sheet 24.

The film holder 18 is provided with mounting clips 78 to releasably position the polarizing plate 34 adjacent the focal plane 26 before the film holder itself is mounted on the section 14 of the camera system 10.

To briefly summarize the operation of the camera system 10, the film pack 22 and polarizing plate 34 are appropriately mounted in the film holder 18 and then that holder is connected to the camera's first section 14. When the subject arrives to obtain his identification card, the operator or an assistant ascertains the necessary information and types that information onto an appropriate data card 32. In addition, the code patterns representing the identification number of the person to whom the card is to be issued along with the timing track for the code patterns are provided on the data card. The timing track marks may already be printed on the card and the code pattern marks placed on the data card manually in black ink. Alternatively, the code track and the timing track to go on the data card may be produced separately as a strip by a photographic process and then placed on the data card. The photographic process of making the strip comprises first making an enlarged version of the code and timing tracks in black ink, then photographing the enlarged version reducing the tracks to the desired size, and then pasting the resulting photographic strip to the data card.

Another method of producing the code and timing tracks on the data card is with a special typewriter with type slugs which will print simultaneously the code pattern representing one character and the corresponding four timing transitions in response to the actuation of each key thereof. The keys of the typewriter display conventional alphanumeric characters thereon and the code pattern that is printed in response to each key actuation represents the character shown on such key. Since only decimal numbers and two special characters are to be represented in the code track in the preferred embodiment, the special typewriter need only have 12 keys.

After the alphanumeric data and the code and timing tracks have been produced on the data card, the data card 32 is mounted on the door 30 and the door is closed to automatically position the data card within the camera system 10 for photographing purposes. The subject is seated in front of the camera system 10 and, gripping the handle 20, the operator aims the camera system 10 at the subject and depresses the button 60. The button 60 simultaneously triggers the shutters of the elements 36 and 54, which shutters in turn fire the flash units 44 and 52.

Light rays from the data card are polarized by the element 62 and an image of the data card is formed on the sheet of photographic material 24 by the lens of the element 36. Similarly, light rays from the subject are polarized by the element 64 and an image of the subject is formed by the element 54 on the sheet of photographic material 24. Since the transmission axes of the polarizing element 62 and the section 72 of the sheet 66 are orthogonally aligned with respect to the polarizing element 64 and the section 74 of the sheet 66, light rays intersecting the section 58 of the sheet of photographic material 24 are limited to those from the subject, while the light rays intersecting section 76 of the sheet of photographic material are limited to those from the data card 32.

Naturally, it is desirable that light rays from the data card 32, which are polarized by the element 62, be directed effectively and efficiently onto the appropriate section 76 of the photographic sheet 24. As indicated, at the same time, it is desirable that section 74 of the sheet 66 preclude any such rays from impinging upon section 58 of the photographic sheet 24. Consequently, the polarization characteristic of such light rays should not be distorted or changed to any extent intermediate the element 62 and the sheet 66. In this respect, the alignment of the mirror 56 and the polarizing element 62 is preferably such that the transmission axis of that element, as depicted by the lines reflected thereon in the drawings, is parallel to the plane of the mirror. Any deviation from this type of alignment could result in a component of the light rays being oriented parallel to the transmission axis of section 74 of the sheet 66, whereby such component would pass through that section of the sheet 66 onto section 58 of the photographic sheet 24.

In the illustrated system, images of both the subject and the data card 32, including the tracks 7 and 8, are simultaneously recorded on the photographic sheet 24. A somewhat different identification card camera system is described in copending U.S. application Ser. No. 864,632 by J. F. Pasieka filed on Oct. 8, 1969, which first records an image of a data card on a sheet of photographic material and, immediately thereafter, records an image of a subject on that photographic sheet. Such other camera system is obviously useful in connection with the present invention. It will be recognized that, in both the illustrated camera system and that of the aforementioned copending application, the images of both the data card and the subject are recorded on the sheet of photographic material at about, or at substantially, the same time.

When the identification card is to be used, the holder of a card presents it to the operator of the optical scanner shown in FIGS. 7–11. As shown in FIG. 7, the identification card, which is identified by the reference number 81, is placed face down on the top of the housing 83 of the optical scanner. The card is positioned so that the code and timing tracks are precisely positioned over a transparent elongated window 84 (See FIG. 11) opening into the interior of the housing 83. The top of the housing 83 is provided with a recess which fits the edges of the card 81 so that the card 81 is guided to the precise location with respect to the window 84. The card 81 is held in place on the housing 83 by means of spring fingers 85. A second card 87, referred to as a station card, is also placed face down on top of the housing 83 adjacent to the card 81. The card 87 also has optically readable data in the form of code and timing tracks on the face thereof just like that on the identification card. When the card 87 is properly positioned on the top of the housing 83, the code and timing tracks on the card 87 will align with the code and timing tracks on the card 81. The code and timing tracks of the card 87 will be directly over a transparent elongated window 88 (See FIG. 11) opening into the interior of the housing 83 when the card 87 is properly positioned on the housing 83 as shown in FIG. 7. Like the card 81, the card 87 is guided to the proper precise location by means of a recess defined in the top of the housing 83 fitting with the card 87 and is held in place by spring fingers 85. The data on card 87, which is provided by the operator of the system, typically may represent the station number and the current security code number for the system.

Figure 11:
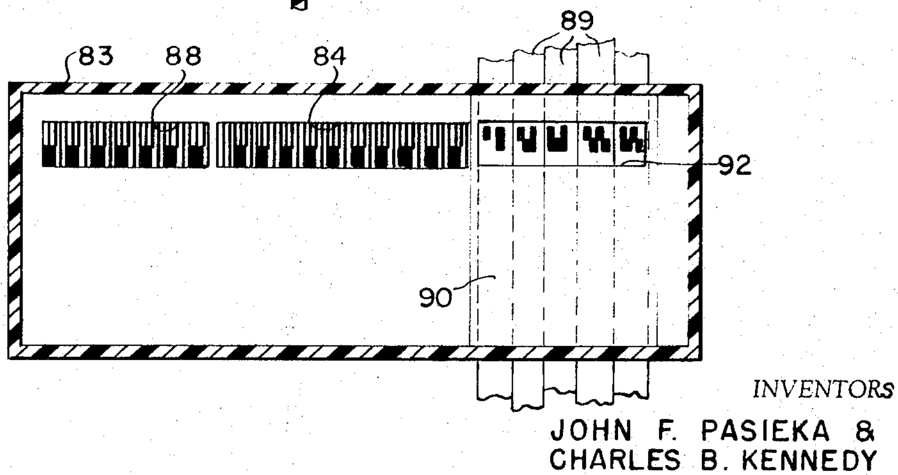
FIG. 11 is a sectional view taken along the lines 11—11 of FIG. 10 illustrating the bottom of the top wall of the housing of the optical scanner and illustrating encoded data optically scanned by the system.
Figures 12, 13, 14:
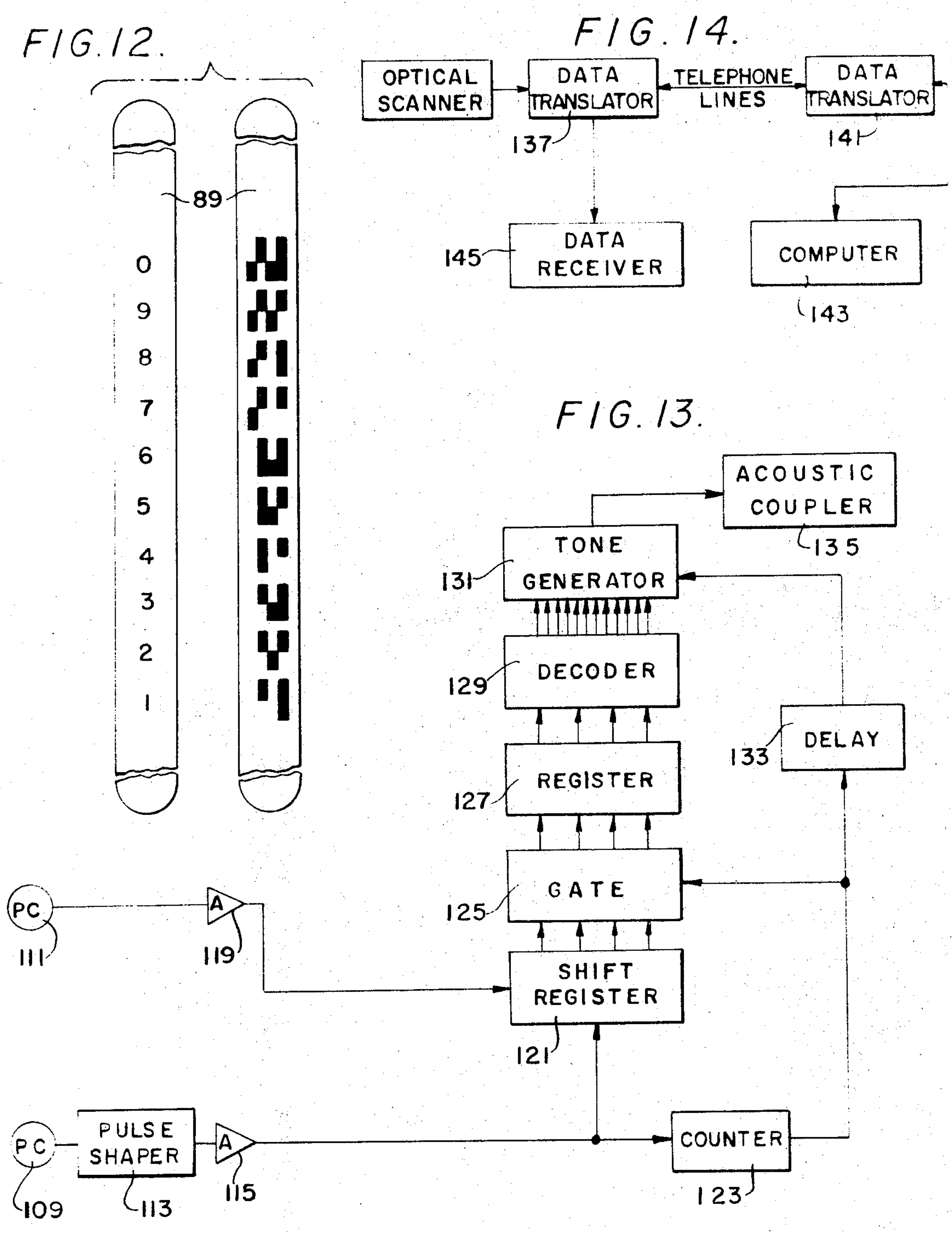
FIG. 12 illustrates the top and bottom of an encoded slidably positionable slat used in the scanning system of FIG. 7 to feed variable input data to the system.
FIG. 13 is a block diagram illustrating the electronics for converting the signals read out by the scanning mechanism of the optical scanner of FIG. 7 into a form to be transmitted over telephone lines.
FIG. 14 is a block diagram illustrating the readout system of the present invention combined with the central station employing a computer utilizing the signals tramsmitted by the readout system.

To the right of the card 81, as shown in FIG. 7, are a series of contiguous coded slats 89. The slats 89 are best illustrated in FIG. 12, which shows the two sides of one of the slats. As shown in FIG. 12, the upper side of the slat is imprinted with the 10 decimal digits 0 to 9 arranged vertically along the slat. On the underside of the slat, as shown in FIG. 12, are code patterns and timing tracks for each of the decimal digits with the code pattern and timing track for each digit being directly under the corresponding digit which the code pattern represents. The timing track for each digit and the code track for each digit extend horizontally across the slat as shown in FIG. 12. The timing track for each digit contains four timing transitions and the code track for each digit contains four code mark positions in the code track. The digits are encoded in code mark positions in exactly the same manner as they are encoded on the identification card as described above except that to facilitate manufacture of the slats the code markings are wider in the direction that the tracks are scanned. This variation in scale of the code markings is permitted because of the timing track which times the readout of the code track. The encoded slats 89 are beneath the top cover of the housing 83 and are slidable longitudinally in guides relative to one another and relative to the housing. An elongated window 91 in the top of the housing 83 exposes a section of each of the slats large enough to show one decimal digit on each slat through the window. By sliding the slats 89 relative to the housing and relative to one another, each of the slats may be made to expose any selected digit through the window 91. Thus, a multi-digit decimal number may be selected to show through the window 91 by sliding the slats 89. The window 91 is positioned to be aligned with the windows 84 and 88 over which the timing and code tracks of the identification card 81 and station card 87 are positioned so that the timing and code tracks under the decimal digits which are exposed through the window 91 will be aligned with the timing and code tracks of the cards 81 and 87. The slats 89 are slidably guided between the top cover of the housing 83 and a plate 90 covering the underside of the slats. As shown in FIG. 11, an elongated window 92 is formed in the plate 90 exposing the code and timing tracks under the digits exposed through the window 91.

Figure 8:
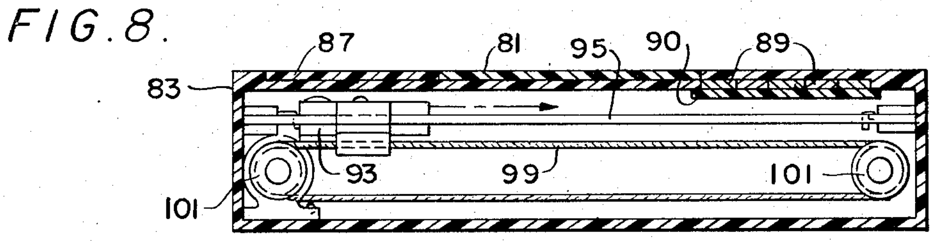
FIG. 8 is a sectional view taken along the lines 8—8 of FIG. 7.
Figures 9, 10:
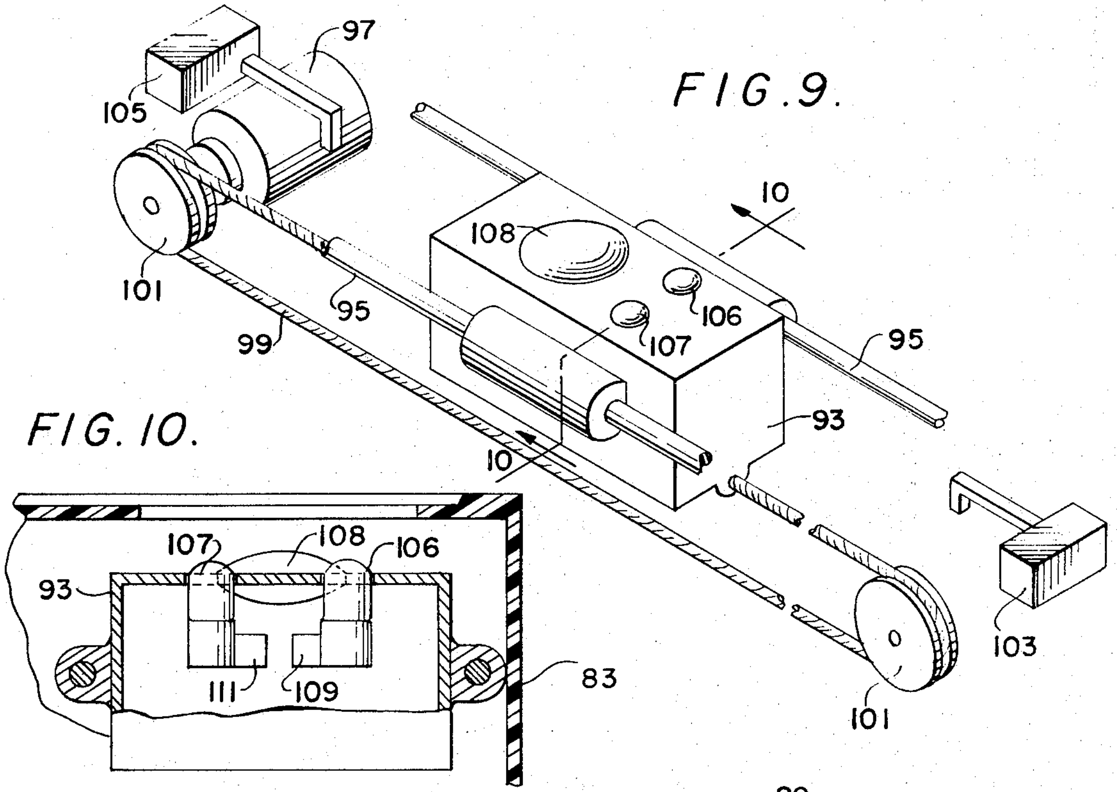
FIG. 9 is a perspective view of the scanning mechanism utilized in the optical scanner of FIG. 7.
FIG. 10 is a sectional view taken through the optical scanning mechanism of FIG. 9 along the lines 10—10 and taken partially through the top plate of the housing of the optical scanner.

Within the housing 83 is a scanning mechanism which when actuated scans the timing and code tracks from left to right starting with the timing and code tracks on the card 87 through the window 88, then the timing and code tracks on the card 81 through the window 84, and finally the timing and code tracks on the slats 89 exposed through the window 92 to read out the encoded data. The scanning mechanism, which is illustrated in FIGS. 8, 9 and 10, comprises a carriage 93 which rides on ball bearings on rails 95. The carriage is driven by means of a motor 97 connected to the carriage 93 by an endless cable 99 riding over pulleys 101. When the motor 97 is energized by a push button switch (not shown) it will drive the carriage 93 to the left scanning, the code and timing tracks on the cards 87 and 81, and on the slats 89 exposed through the window 92. When the carriage 93 has scanned the code patterns on the slats 89 and comes to the end of its travel, it actuates a limit switch 103, which reverses the energization of the motor and causes the motor to bring the carriage 93 back to its home position at the left end of the housing 83 as viewed in FIG. 7. When the carriage 93 reaches its home position, it actuates a second limit switch 105, which de-energizes the motor 97.

Carried by the carriage 93 are two light sources 106 and 107, which shine beams of light to illuminate a portion of the timing track and code track respectively directly above the light sources 106 and 107. As the carriage 93 is driven from left to right under the timing and code tracks, the illuminated portion will scan across the two tracks on the card 87, the card 81, and the slats 89. Also provided on the carriage 93 is a lens 108 which focuses an image of the illuminated portion of the timing track on a photocell 109 and focuses an image of the illuminated portion of the code track on a photocell 111. Each of the photocells 109 and 111 is provided with a mask having a slit for light transmission extending in a direction transverse to the code and timing tracks. The width of these slits is small relative to the distance between adjacent timing transitions on the timing track. As a result, the photocells 109 and 111 will sense the code and timing tracks with high resolution as the carriage 93 moves from left to right and the scanning mechanism scans the two tracks.

When either of the two photocells 109 and 111 senses an illuminated dark area from the track being scanned, the photocell will produce a high level output signal and when either of the two photocells senses a light area of the track being scanned, the photocell will produce a low level output signal. As a result of the timing track changing from light to dark and dark to light at the regularly occurring transitions, the photocell 109 sensing the timing track will produce a square waveform output as the scanning mechanism 93 scans the timing track. This square waveform output, as shown in FIG. 13, is applied to a pulse shaper 113, in which it is differentiated and rectified in a pulse shaper 113 to produce an output pulse for each timing transition in the timing track. The output pulses of the pulse shaper 113 are timing pulses and are amplified by an amplifier 115. The output of the photocell 111 is amplified by an amplifier 119 which also inverts the signal so that the output of the amplifier 119 is high when the photocell 111 is sensing a black area on the code track and is low when the photocell 111 is sensing a white area on the code track. Because of the inherent delay in the pulse shaper 113, the timing pulses produced by the amplifier 115 will be slightly after the point in time that the transition which caused the pulse is scanned by the photocell 109. As a result, the timing pulses from the amplifier 115 will occur at a time when the photocell 111 is scanning the code track just past a transition in the timing track.

Each output timing pulse of the amplifier 115 is applied to a shift register 121, which is also connected to receive the output signal of the amplifier 119. Each time a timing pulse is applied to the shift register 121 from the amplifier 115, the shift register is shifted forward one stage and the first stage of the shift register is set in accordance with the output signal of the amplifier 119. Thus, if the output signal of the amplifier 119 is high indicating that a binary one is being read, a binary one will be stored in the first stage of the shift register; and if the output signal of the amplifier 119 is low indicating that a binary zero is being read, a binary zero will be stored in the first stage of the shift register 121.

The timing pulses produced by the amplifier 115 are also applied to a counter 123 which produces an output pulse and recycles to zero on every fourth output pulse produced by the amplifier 115. When the four stages of the shift register 121 have been filled with binary digits representing the code pattern representing a character, the counter 123 will recycle to zero and produce an output signal which enables a gate 125. The gate 125 is connected to receive signals representing the binary data stored in the four stages of the shift register 121 and when it receives an enabling signal from the counter 123, it passes these signals to be stored in the register 127. Thus each time a binary code has been read out and stored in the shift register 121, it is then transferred to the register 127 through the gate 125.

Signals representing the binary number stored in the register 127 are applied to a decoder 129 which produces an output signal on a different output channel for each different binary code stored in the register 127. As explained above, the present system utilizes the ten decimal digits plus two special characters making a total of twelve possible characters. Thus the decoder 129 will have twelve output channels, one representing each of the twelve possible characters which can be represented by the binary code in the register 127. The output of the decoder 129 is applied to a tone generator 131 which also receives the output signals from the counter 123 when it recycles to zero through a delay circuit 133. The tone generator 131 may be similar to that disclosed in the U.S. Pat. to Meacham et al. No. 3,184,554 and generates a combination of two audio signal frequencies to represent each of the 12 characters. In the Meacham patent the two frequencies are selected in response to push button actuation which closes switches in a matrix. In the system of the present invention, the switches in the matrix are closed electronically in response to the output signals of the decoder 129. The output signals of the tone generator 131 are applied to an acoustic coupler 135 and then transmitted over telephone lines to a central station.

In FIG. 14 the signal translator 137 includes the circuit shown in FIG. 13 to convert the signals produced by the optical scanner to audio frequency signals to be transmitted over the telephone lines 139 to a central station. At the central station the audio frequency signals are received by a signal translator 141, which converts them to a form to be utilized by a computer 143. The computer 143 receives the signals and then responds sending signals back to the translator 141 in response to the data received from the signal translator 137. The signal translator 141 converts the signals received from the computer 143 to audio frequency signal combinations which are then transmitted back to the signal translator 137. The translator 137 converts the received signals to a form to be received and displayed by a data receiver 145.

The computer 143, for example, may determine how much money is in the account of the person identified by the identification card and then send this information back to the data receiver 145 via the signal translators 141 and 137. Alternatively, the computer 141 may automatically debit the account of the individual which the identification card identifies.

The system of the present invention is used in the following manner. A person who wishes to receive an identification card has an identification card with his facial image made by a camera such as shown in FIGS. 2–6. At this time data is transmitted to the computer 143 setting up his account in the computer and identifying the account by his identification number. Then when the person wishes to use the identification card to make a purchase or cash a check, he presents the card at a remote station containing one of the optical scanners and signal translators as disclosed in FIGS. 7–13. The operator of the optical scanner first identifies the person by the facial image on card and puts the card in the optical scanner. The operator of the optical scanner also sets the slats to indicate variable data to be transmitted to the central station such as the amount of the purchase being made by the person with the identification card. The data encoded on the card plus the variable data represented by the encoded slats plus the fixed data on the station card is then transmitted by the signal translator 137 to the central station where the information is then utilized as described above. The security code on the station card serves to prevent unauthorized persons from gaining access to the computer.

While the card markings on the tracks 7 and 8 are depicted in the illustrated embodiment as being in the visible range, it should be understood that this invention encompasses arrangements wherein such code markings are invisible. In either instance, the reader merely differentiates between lighter and darker areas comprising same.

The above-described identification card system thus provides a simple manner of manufacturing the identification cards and also provides a simplified system for automatically reading out the encoded data on the cards. The fact that the optical system is used to read out the variable data on the slats and on the station card as well as on the identification card simplifies the system since the optical system for reading out the identification card is already required and no additional electronics are required to read out the other data. The system is further simplified by the use of the timing track, which eliminates the need for a precision clock and precise scanning speeds. The fact that this system records the code on the identification card at the same time that a facial image is photographed onto the card greatly simplifies the manufacture of the identification cards. Thus, the system of the present invention provides a greatly simplified and improved identification card system.

The above description is of a preferred embodiment of the system and many modifications may be made thereto without departing from the spirit and scope of the invention.

We claim:

1. An identification card readout system for identification cards having optically readable data encoded in a track comprising receiving means for receiving one of said identification cards with the track on said card located in a predetermined position, means defining an optical scanning path, a plurality of slats each maintained rectilinear in shape throughout the entire length thereof and arranged perpendicularly to said path intersecting said path, a plurality of code tracks each containing optically readable encoded data printed on each of said tracks extending parallel to said path, the data on said slats being encoded in the same manner that the data is encoded on said identification cards, said slats being manually slidable relative to one another and relative to said scanning path to enable different code tracks on each of said slats to be selectively moved into said scanning path, and means to optically scan the track on the identification card received by said receiving means in said predetermined position and the encoded data in said scanning path to transduce the encoded data in the track on the identification card and in the scanning path to signals representing said data.

2. A data input system comprising means defining an optical scanning path, a plurality of slats each maintained rectilinear in shape through the entire length thereof and arranged perpendicularly to said path intersecting said path, a plurality of code tracks each containing optically readable encoded data bits printed on each of said slats extending parallel to said path, said slats being manually slidable relative to one another and relative to said path to enable different code tracks on each of said slats to be selectively moved into said path, and means to optically scan said path to transduce the encoded data in said path to a plurality of signals representing each encoded bit in said path.

3. A data input system as recited in claim 2 wherein alphanumeric characters are printed on the opposite sides of said slats from said code tracks to indicate the data encoded in each of said tracks.

4. A data input system as recited in claim 3 wherein only one alphanumeric character is encoded in each track on each of said slats.

5. A readout system for identification cards having optical readable data encoded in a code track on said cards and timing markings in a timing track on said cards parallel to said code track indicative of the position of the discrete bits of said data on said code track, comprising means for receiving one of said identification cards with said tracks of said card located in a predetermined position, first scanning means for optically scanning said code track and producing one or more signals representative of said data and for producing one or more signals indicative of said readout system in sequence with the production of the signals representative of said data, said first scanning means including means to register the signals produced by said first scanning means, second scanning means for optically scanning said timing track simultaneously as said code track is scanned and for activating said first scanning means responsive to inputs from said timing track to register signals produced by said first scanning means, said timing markings being transitions between light and dark areas of said timing track, said second scanning means activating said first scanning means in response to each of said transitions in said timing track.

6. A readout system for optically encoded data in which data is represented by patterns of light and dark code marks in a data track with an adjacent timing track having regularly occurring timing marks in the form of transitions between light and dark areas of said timing track comprising first optical transducing means for scanning said data track to produce an output signal indicating whether the portion of said data track currently being scanned is light or dark, and second optical transducing means for scanning said timing track to produce timing signals in response to said transitions in said timing track, one timing signal being produced in response to each transition, and translating means responsive to the signal produced by said first transducing means and in response to the each of timing signals produced by said second transducing means to produce data signals indicative of the data stored in said data track.

7. A readout system as recited in claim 6 wherein said translating means senses the condition of the output signal of said first transducing means in response to each timing signal received from said second transducing means to produce a first data signal indication when the condition of the output signal of said first transducing means indicates that the code mark currently being scanned is dark at the time a timing signal is received and a second data signal indication when the condition of the output signal of said first transducing means indicates that the code mark currently being scanned is light at the time a timing signal is received.

8. A method of reading at optically encoded data in the form of patterns of light and dark code marks in a data track having an adjacent timing track in which timing signals are recorded in the form of transitions between light and dark areas in said timing track comprising scanning said first track with a transducing means to produce an output signal indicating whether the area of said code track currently being scanned is light or dark, simultaneously scanning said timing track producing a timing signal in response to each transition in said timing track, generating a first data signal indication when the output signal produced from scanning said data track indicates that the code mark currently being scanned in said data is dark each time a timing signal is produced by the scanning of said timing track, and generating a second data signal indication when the output signal produced from scanning said data track indicates that the code mark currently being scanned in said data track is light each time a timing signal is produced by the scanning of said timing track.

9. An identification card readout system for identification cards having optical readable data comprising a plurality of data bits coded in a track on said card comprising first card receiving means for receiving one of said identification cards with the track on said identification card located in a predetermined position, second card receiving means to receive simultaneously with an identification card received by said first card receiving means a second card having additional optical readable data comprising a plurality of data bits encoded in a second track in the same manner that data is coded in the track on said identification cards, and a single scanning means to scan in sequence the track on the identification card received by said first card receiving means and to scan the second track on said second card to transduce the data encoded on the identification card and on said second card to signals representing said data bits while said identification card and said second card are simultaneously received by said first and second card receiving means.

10. An identification card readout system as recited in claim 9, wherein said scanning means comprises means for illuminating said tracks and light detecting means for detecting light reflected from said tracks.

11. An identification card readout system as recited in claim 9, wherein said second card receiving means positions said second card to have said second track colinear with the track on the identification card, said scanning means scanning the track on said identification card, and said second track in sequence in a single transverse of a scanning path extending over both of said tracks.

* * * * *